(12) United States Patent
Kashi et al.

(10) Patent No.: US 8,543,310 B2
(45) Date of Patent: Sep. 24, 2013

(54) METHOD AND DEVICE FOR ASSISTING A LANE CHANGE OF A VEHICLE

(75) Inventors: Amin Kashi, Dearborn, MI (US); Anders Grauers, Partille (SE); Pradeep Nold, Cologne (DE); Stefan Kappes, Pulheim (DE); Maciej Bak, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 13/007,108

(22) Filed: Jan. 14, 2011

(65) Prior Publication Data
US 2011/0196592 A1 Aug. 11, 2011

(30) Foreign Application Priority Data
Jan. 14, 2010 (DE) .................. 10 2010 004 625

(51) Int. Cl.
*G05D 1/00* (2006.01)
*G06F 17/00* (2006.01)

(52) U.S. Cl.
USPC .................. 701/96; 701/70; 701/93

(58) Field of Classification Search
USPC ............... 701/96, 70, 93, 301; 180/169, 170; 340/435, 436, 903
See application file for complete search history.

(56) References Cited

U.S. PATENT DOCUMENTS

| 5,761,629 | A | * | 6/1998 | Gilling | 701/96 |
| 6,353,788 | B1 | * | 3/2002 | Baker et al. | 701/96 |
| 6,842,687 | B2 | | 1/2005 | Winner et al. | |
| 2006/0009910 | A1 | * | 1/2006 | Ewerhart et al. | 701/96 |
| 2009/0105923 | A1 | * | 4/2009 | Etori | 701/96 |

FOREIGN PATENT DOCUMENTS

| DE | 4200694 A1 | 7/1993 |
| DE | 19757063 A1 | 6/1999 |
| EP | 1037760 A1 | 9/2000 |

* cited by examiner

*Primary Examiner* — Thomas Tarcza
*Assistant Examiner* — Kevin Myhre
(74) *Attorney, Agent, or Firm* — Frank A. MacKenzie; Brooks Kushman P.C.

(57) ABSTRACT

A method for operating an automatic speed control system of an automotive vehicle. Initially, in a normal follow mode, a setpoint distance between the vehicle and a preceding vehicle is set to a first value $d_1$, and a setpoint vehicle acceleration is into a first value $a_1$. Upon detection of an intention of the vehicle driver to overtake the preceding vehicle (such as switching on a turn indicator), the setpoint distance is reset to a second value $d_2$ that is smaller than $d_1$. The setpoint acceleration may be reset to a second value $a_2$ greater than $a_1$ simultaneously, or the second value $a_2$ may be set upon detection of initiation of a lane change into an overtaking lane (such as turning a steering wheel). The method assists the driver during the execution of an overtaking process, and a safer, more comfortable and free-flowing sequence of the overtaking process is ensured.

16 Claims, 5 Drawing Sheets

METHOD AND DEVICE FOR ASSISTING A LANE CHANGE OF A VEHICLE

CROSS-REFERENCE TO RELATED APPLICATIONS

This application claims foreign priority benefits under 35 U.S.C. §119 (a)-(d) to DE 10 2010 004 625.6, filed Jan. 14, 2010, which is hereby incorporated by reference in its entirety.

BACKGROUND

1. Technical Field

The invention relates to a method of operating an automatic speed control system to assist a driver of a vehicle during an overtaking or passing process.

2. Background Art

Overtaking processes require the driver of a motor vehicle to coordinate a multiplicity of different tasks. These include, before the overtaking process starts, not only that the driver stays in the traffic lane but also that he maintains a minimum distance from the vehicle traveling ahead and observes any traffic on a further lane which is required for the overtaking process. In order to relieve the driver in maintaining a predefined velocity and following a vehicle traveling in front while maintaining a minimum distance therefrom, adaptive cruise control methods have been developed in which the acceleration and deceleration of the motor vehicle are adjusted on the basis of data detected by a sensor system (such as radar, lidar, or a vision system) in such a way that the velocity and/or distance from the vehicle traveling ahead are kept constant within a predefined range. Distance-related cruise control systems are known in which the control system adjusts to a predefined velocity if no preceding vehicle (traveling immediately ahead) is detected by the sensor system, and the control system is then adjusted to a predefined distance if such a vehicle has been detected in a corresponding distance range.

During an overtaking process it is necessary to intervene in such a control system because the adaptive cruise control system would otherwise not permit acceleration until the vehicle to be overtaken (the preceding vehicle) is located completely outside the traveling path of the overtaking vehicle or is no longer detected by the sensor system. Otherwise, the acceleration required for the overtaking process is usually already initiated by the driver before a lane change in order to be able to terminate the overtaking process within a relatively short time and in order to be able to more safely cut into the more quickly flowing traffic on the overtaking lane. In the interests of a harmonious and free-flowing overtaking process whose sequence corresponds to the driving style of a human driver, it is therefore desirable to adapt the automatic adaptive cruise control process as soon as the driver's intention to overtake can be detected.

DE 42 00 694 A1 discloses interrupting the adaptive cruise control process for a predefined time period if the driver indicates an intention to overtake by, for example, activating a turn indicator. This has the disadvantage that the automatic adaptive cruise control system which ensures that a safety distance from the preceding vehicle is maintained does not function during this time period.

As is described in EP 1 037 760 A1, before an overtaking process the setpoint value for the distance from the preceding vehicle, which is predefined for the adaptive cruise control process, can be reduced to a minimum permissible distance. If the system detects a risk of collision, the overtaking process is aborted and the vehicle brakes may be applied, if appropriate.

U.S. Pat. No. 6,842,687 B1 discloses a method for assisting the driver of a motor vehicle during an overtaking process in which the distance from a preceding vehicle on the same lane and the distance from a vehicle traveling directly ahead on the overtaking lane are measured. If a desire to overtake on the part of the driver is detected, an overtaking speed is calculated and an adjustment to the overtaking speed is superimposed on the steady-state adaptive cruise control system. In the above-mentioned methods, an acceleration which corresponds to the adaptive cruise control and/or cruise control process is used; however, this is generally set to a rather low value for reasons of travel comfort and economy. As a result, it is not possible to carry out the overtaking process in an optimal way. Also, such a sequence differs from the driving style of a human driver in so far as said driver would be likely to use a significantly increased acceleration for overtaking.

SUMMARY

In a disclosed embodiment, a method for operating an automatic speed control system of an automotive vehicle comprises initially setting a setpoint distance between the vehicle and a preceding vehicle to a first value $d_1$ and setting a setpoint vehicle acceleration to a first value $a_1$. The setpoint values of $d_1$ and $a_1$ are appropriate for driving in a normal driving or "follow mode." Upon the detection of an intention of the vehicle driver to overtake the preceding vehicle (such as switching on a turn indicator), the setpoint distance is reset to a second value $d_2$ that is smaller than $d_1$, and the setpoint acceleration is reset to a second value $a_2$ greater than $a_1$. The new setpoint distance and acceleration values allow a crisp, safe, and comfortable overtaking maneuver to be accomplished.

In a further disclosed embodiment, a method for operating an automatic speed control system of an automotive vehicle comprises initially setting a setpoint distance between the vehicle and a preceding vehicle to a first value $d_1$ and setting a setpoint vehicle acceleration to a first value $a_1$. Upon the detection of an intention of the vehicle driver to overtake the preceding vehicle (such as switching on a turn indicator), the setpoint distance is reset to a second value $d_2$ that is smaller than $d_1$. Upon detection of initiation of a lane change into an overtaking lane, the setpoint acceleration is reset to a second value $a_2$ greater than $a_1$.

BRIEF DESCRIPTION OF THE DRAWINGS

The invention will be explained in more detail below by way of example with reference to the drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3A:
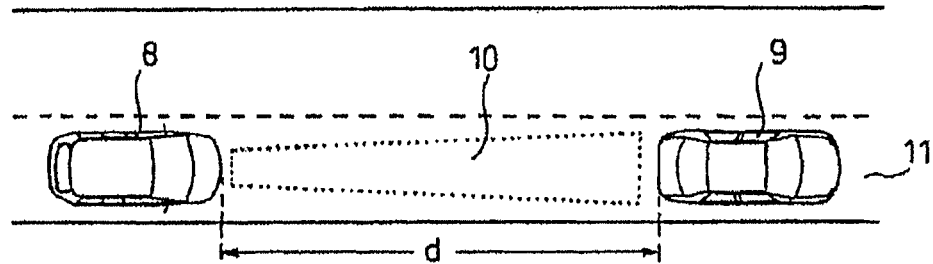
FIGS. 3a to 3c show, in plan view, the driving situation in various phases according to one exemplary embodiment of the method according to the invention.

Referring to FIG. 3a, a host motor vehicle 8 is equipped with an automatic speed control system operative to maintain and/or adjust a following distance 8 between the host vehicle 8 and a preceding vehicle 9 traveling ahead of and in the same traffic lane 11 as the host vehicle. An automatic speed control system of the general type discussed herein may be of the type commonly referred to in the automotive industry as adaptive cruise control, automatic cruise control, or ACC. In these known ACC systems, the current or existing following distance d is continuously measured by a sensor system (employing radar, lidar, and/or vision sensors, for example). The current following distance d is transmitted to an electronic control device or module which intervenes in the engine controller in such a way that the following distance (or time interval) is kept essentially constant at desired value. When the actual following distance deviates of from the desired distance, the control module increases or decreases the speed of the host vehicle 8 as necessary to achieve the desired distance.

In this discussion, the desired distance that is being used at any particular time by the automatic speed control system is referred to as the setpoint distance.

In this context, the setpoint distance may be defined by the driver or may be determined by a control device, for example using a computational instruction or from a predefined table as a function of other parameters and/or measured variables. In particular, the setpoint distance can be specified based upon a selected setpoint time interval, i.e. by the time which the motor vehicle takes to travel along the setpoint distance. The setpoint time interval is linked to the setpoint distance by the current velocity of the motor vehicle.

If the current distance d is larger than the setpoint distance, the velocity of the motor vehicle can be increased by intervention into the drive control system. If the current distance is significantly larger than the setpoint distance or if there is no preceding vehicle in the detection range of the sensor system, the velocity can exclusively be adjusted to a setpoint velocity (cruise control mode). When a relatively slow preceding vehicle is approached, the adjustment to the setpoint distance kicks in and the setpoint velocity is then no longer reached, in the same way as when the motor vehicle follows at a setpoint distance the vehicle which is traveling ahead.

The type and degree of reaction by the automatic speed control system to a deviation of the current distance and/or velocity from the respective setpoint values may depend, according to the configuration of the control system, on the size of the deviation and also on further parameters. As a rule, adaptive cruise control systems always permit intervention by the driver to override the setpoint values.

It what is referred to herein a "follow mode," the following distance between the host vehicle 8 and preceding vehicle 9 is set to a first setpoint distance $d_1$ that is appropriate for safe driving under assumed or detected driving conditions. If the host vehicle sensor system detects that it is at a significantly larger distance from the preceding vehicle, the cruise control system can, if appropriate, intervene to increase the vehicle velocity to a setpoint velocity. In order to reduce the current distance from the preceding vehicle so as to match the setpoint distance $d_1$, a first setpoint acceleration $a_1$ is applied by the control system to increase the vehicle velocity. As a result of such an intervention by the automatic speed control system, the host vehicle 8 accelerates at the setpoint acceleration $a_1$. The setpoint acceleration $a_1$ has a value appropriate for safe and comfortable driving in the follow mode under assumed or detected driving conditions. Depending on the existing deviation from the setpoint distance $d_1$ it is possible for the actual acceleration applied to be lower than $a_1$. The actual acceleration may increase gradually, in accordance with a predefined ramp, up to the available acceleration $a_1$.

The first setpoint distance $d_1$ and the first setpoint acceleration $a_1$ are preferably selected in such a way that the control process in the follow mode permits comfortable and economic driving.

If it is determined, at a starting time $t_s$, that the driver of host vehicle 8 intends to overtake the preceding vehicle 9, the setpoint distance is reset to a second value $d_2$ which is smaller than the first setpoint distance $d_1$. For this purpose, the lower setpoint distance $d_2$ may be set immediately after detection of the driver's intention to overtake, i.e. after the execution of necessary computational operations or, if appropriate, detection and processing of measured values. However, it is also possible that the setpoint distance is changed only with a predefined deceleration or even gradually.

The second setpoint distance $d_2$ is preferably of a value such that the necessary safety distance is maintained in all cases. This value is, however, smaller than the first setpoint distance $d_1$ to allow the overtaking process to be completed more quickly. This also corresponds to the customary driving style when overtaking.

After the driver's intention to overtake the preceding vehicle is determined, the available setpoint acceleration is increased to a second value $a_2$ which is higher than the first acceleration $a_1$. This increase preferably occurs at the same time or somewhat after the reduction in the setpoint distance to $d_2$. The increased acceleration $a_2$ is made available in order to more quickly adjust the setpoint velocity to a level higher than the velocity of the preceding vehicle in the case of distance-related cruise control. This means that once the intention to overtake has been detected/determined, a move rapid acceleration is possible than during the follow mode.

As soon as the driver's intention to overtake has been determined, acceleration of a magnitude calculated to be necessary to initiate the overtaking maneuver will take place since the control process adjusts to achieve the reduced setpoint distance $d_2$ by increasing the velocity of the host vehicle. As soon as the overtaking acceleration $a_2$ is available, the host vehicle is accelerated more quickly.

As a result, free-flowing execution of the overtaking process and, if appropriate, easier entry into the faster-moving traffic in the overtaking lane (the left lane 14 in FIGS. 3a-3c) is possible. Together with the approaching to the preceding vehicle this makes it possible to ensure a free-flowing sequence of the overtaking process which simulates the driving style of a human driver. At the same time, maintenance of a minimum distance, in particular of a necessary safety distance, from the preceding vehicle continues to be ensured. As a result of the automatic sequence of the method which is triggered via the detectable intention of the driver to overtake, the driver is therefore relieved of a multiplicity of tasks when performing overtaking.

The overtaking acceleration $a_2$ may be made available only if the initiation of a lane change is detected within a predefined time period $\Delta t$ after the starting time $t_s$. In order to increase the velocity as necessary to reduce the distance from the preceding vehicle there is therefore initially only the acceleration $a_1$ available, which is made available during the follow mode, in order to react to deviations of the distance or the velocity from the respective setpoint value. As a result, after detection of the driver's intention to overtake the approaching to the preceding vehicle occurs at a relatively low acceleration and, in accordance with the setting of the control system, relatively low differential speed with respect to the preceding vehicle. The second acceleration $a_2$, which is increased compared to the first acceleration $a_1$, is made available only if a lane change is initiated within the time period $\Delta t$ after the starting time $t_s$. Said increased acceleration $a_2$ is preferably made available directly after detection of the initiation of the lane change, i.e. after execution of necessary computational operations or, if appropriate, detection and processing of measured values.

In this context, the time period $\Delta t$ is preferably selected in such a way that under typical conditions within this time period a lane change has to be initiated in order to change over from the following acceleration to the increased overtaking acceleration in order to initiate the actual overtaking process. The time period $\Delta t$ may be, for example, 8 seconds here, which has proven favorable for a large number of driving situations. However, $\Delta t$ can also be dependent on various measured values and parameters, for example on the current velocity, on the distance and the relative velocity with respect to the preceding vehicle, on the setpoint distances $d_1$ and $d_2$ and the accelerations $a_1$ and $a_2$. The increased acceleration $a_2$ is available, in particular, in order to adjust, in the case of an adaptive cruise control process, to the setpoint velocity which is higher than the velocity of the preceding vehicle if the preceding vehicle is no longer detected as a preceding vehicle after initiation of the lane change and, in particular, after the lane change onto an overtaking lane 14, or is no longer occupying the same lane 11. In this case, the automatic speed control system is no longer active or adjusts to a new setpoint distance from a preceding vehicle on the overtaking lane.

Since the overtaking acceleration is available only after initiation of a lane change and therefore only for the execution of the actual overtaking process, a safe and free-flowing execution of the overtaking process is possible. In particular, a situation is avoided in which when the lane change does not occur, for example because the driver aborts the overtaking process, abrupt braking takes may be required to maintain the minimum distance. Together with the previously occurring approaching to the preceding vehicle it is possible, as a result, to ensure a particularly harmonious, comfortable and free-flowing sequence of overtaking processes, which simulates the driving style of a human driver.

The setpoint following distance may be readjusted downward to the first value $d_1$ if no initiation of a lane change has been detected within the predefined time period $\Delta t$ after the starting time $t_s$. This ensures that the follow mode is continued with the setpoint distance which applies for it, if, despite intending to overtake, the driver has not initiated the actual overtaking process, for example because, contrary to his original estimation, there is not a sufficient gap available on the overtaking lane.

Furthermore, it may be advantageous if the second, increased acceleration $a_2$ which is made available after detection of the initiation of a lane change is made available at maximum for a time interval $\Delta t_a$ and only the first, lower acceleration $a_1$ is then available again. As a result, excessive acceleration, which could adversely affect the driving comfort and the feeling of safety of the vehicle occupants, can be avoided. The time interval $\Delta t_a$ is preferably measured here in such a way that within this time interval the increased acceleration $a_2$ is sufficient to reach, in typical situations, a velocity which is already largely sufficient for the overtaking process, or to approach the setpoint velocity which is applicable for the cruise control process.

For the further course of the overtaking process after the time interval $\Delta t_a$ has expired, in particular for the further acceleration up to the point where the setpoint velocity is reached, the control process is again based on the first acceleration $a_1$. The time interval $\Delta_a$ can, in particular, be three seconds, which has proven favorable for a large number of driving situations. However $\Delta t$ can also be dependent on various measured values and parameters, for example on the current velocity, on the distance and the relative velocity with respect to the vehicle to be overtaken, on the setpoint distances $d_1$ and $d_2$, the accelerations $a_1$ and $a_2$ or else on the currently achievable acceleration as a function of the engine power, of the selected transmission ratio, of the cargo, of the current positive gradient or negative gradient of the road etc.

The second, overtaking acceleration $a_2$ may be made available at maximum once within the time period $\Delta t$ after the starting time $t_s$. This means that even in the case of further detection of the initiation of a lane change within the time period $\Delta t$, the increased acceleration $a_2$ is not available once more for a further time interval $\Delta t_a$, and the time interval within which the increased acceleration $a_2$ is made available likewise cannot be prolonged by renewed detection of the initiation of a lane change within the time period $\Delta t_a$. The increased acceleration $a_2$ is then not available again until an intention by the driver to overtake is detected once more after expiry of the time period $\Delta t$ after the starting time $t_s$, and a new starting time is therefore set. This increases the operational reliability of the method.

Figure 3B:
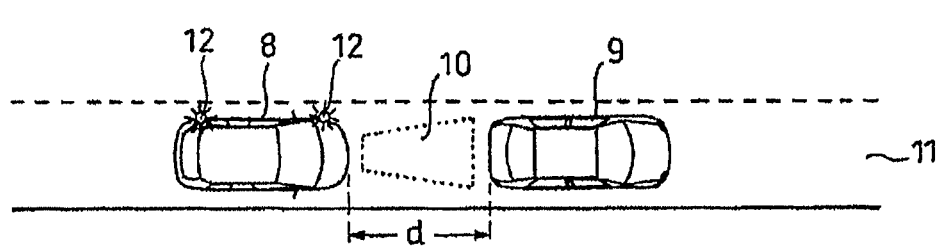
Figure 3C:
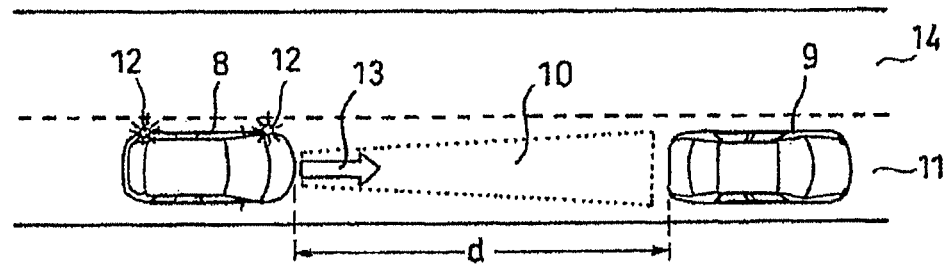

According to a further possible feature, one or more indicators of the driver's intention to overtake are detected, which indicators may for example comprise activation of the turn indicator. The particular direction in which the turn indicator is activated is that direction to accomplish a normal overtaking maneuver (left as shown in FIGS. 3a-3c) and not in the opposite direction which may indicate, for example, turning off the road or stopping on the shoulder. The normal overtaking direction can be predefined, in particular, on a country-specific basis, for example in countries which drive on the right this is the activation of the turn indicator to the left.

Additional indicators, such as for example the viewing direction of the driver, can be used to determine the driver's intention to overtake. The driver's viewing direction (direction of gaze) may be detected by known optical devices. The detection of the indicators, for example of the position of the turn indicator and/or gaze direction, is preferably carried out on a continuous basis, i.e. in real time or in accordance with the processing speed in a control device. Since in this way the activation of operator control elements which are present in the motor vehicle is utilized to detect the driver's intention to overtake, a simple and intuitive application of the method is made possible.

Furthermore, the driver's intention to overtake may be determined only if the current velocity of the motor vehicle is higher than a predefined limiting value $V_{min}$, for example higher than 65 km/h. Only at such a velocity is it possible to assume with sufficient certainty that, for example, activation of the turn indicator by the driver indicates an intention to overtake.

Indicators used in the determination of the initiation of a lane change may also be detected and used in the method. The secondary indicators may comprise one or more of the following measured or calculated variables: vehicle steering angle, steering angle change rate, time integral of the steering angle, yaw rate of the vehicle, lateral acceleration of the vehicle, and/or activation of the turn indicator in the direction corresponding to the lane change. Both steering angle and the steering angle change rate (as well as changes thereof over time) and the integral over time represent an action by the driver which is used by the driver to bring about the lane change. The angular velocity of the yawing movement and the lateral acceleration which the motor vehicle experiences represent the reactions of the motor vehicle to the driver's action and can therefore also serve as indicators for the lane change, in particular as confirmation of the initiation of the lane change by the steering movement. The activation of the turn indicators can also be evaluated for this purpose. The specified variables are preferably detected or calculated in real time and/or in accordance with the detection rate and the processing speed of a control device. The detection of the initiation of the lane change by such indicators permits a particularly simple and intuitive application of the method.

It may be preferred that the initiation of a lane change is detected/determined only if the turn indicator is set, in particular in a predefined direction, which permits an intention to overtake to be detected. As a result, it is easily possible to differentiate between a lane change and traveling round a curve.

In a further embodiment, a value of a first safety function $S_1$ may be calculated, and the following distance from the preceding vehicle is adjusted to the second, smaller setpoint value $d_2$ only if the current value of the first safety function $S_1$ is within a range which is predetermined to indicate that conditions are proper for a safe overtaking maneuver.

In a further embodiment, a value of a second safety function $S_2$ may be calculated, and the second, increased setpoint acceleration $a_2$ is set only if the current value of the second safety function $S_2$ is in a range which is predetermined to indicate that conditions are proper for a safe overtaking maneuver. As a result, it is possible to take into account safety-related measured values and parameters which may make overtaking or even the reduction in the distance from the preceding vehicle or a lane change appear critical.

In particular, one or more of the following measured or calculated variables can be evaluated for the calculation of the first and/or second safety functions: The current velocity of the motor vehicle; the angular velocity of the motor vehicle with respect to any desired axes; the current distance from the preceding vehicle; the rate of change of the distance from the preceding vehicle; and/or the yaw rate. This permits reliable detection of vehicle-movement-dynamic situations which rule out overtaking.

It is further possible to determine a driver's intention to abort overtaking, for example by switching off of the turn indicator. In this case, the setpoint distance is readjusted back to the first value $d_1$ and the setpoint accelerations is returned to the first acceleration $a_1$, these values being appropriated for following. The setpoint distance is adjusted again to the overtaking setpoint distance $d_2$ only when there is a subsequent, renewed detection of an intention to overtake. As a result, the driver is enabled to intuitively influence the sequence of the method at any time. Renewed detection of the intention to overtake may be possible immediately, or only after the expiry of a time interval Δt after the preceding detection of an intention to overtake; this results in increased protection against incorrect operator control. In addition, there may be safety reasons for the driver to be able to intervene in the sequence of the method at any time to change speed and/or abort the overtaking procedure.

Figure 1:
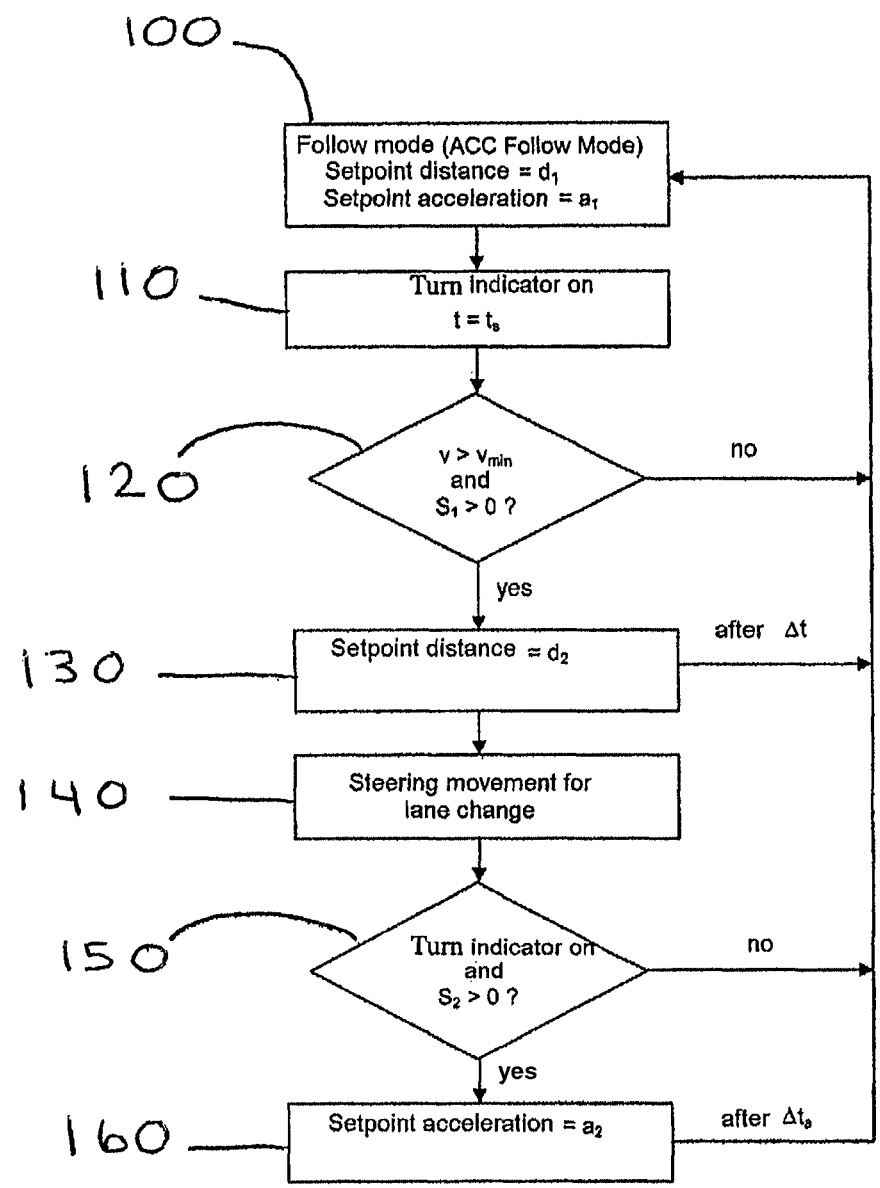
FIG. 1 is a simplified block diagram showing the sequence of an exemplary embodiment of the method according to the invention.

Referring to FIG. 1, in an exemplary embodiment of the disclosed method the initial condition (block 100) is with an automatic vehicle speed control system in a follow mode (ACC Follow Mode). The automatic speed control system referred to herein may be of the type commonly referred to in the industry as adaptive cruise control or ACC. In the follow mode, the current following distance of the vehicle behind a preceding vehicle in the same lane is continuously detected by a sensor system (employing radar, lidar, and/or vision sensors, for example). The current following distance is transmitted to a control device or module which intervenes in the engine controller in such a way that the following distance is kept essentially constant at the selected setpoint value of $d_1$. When the current following distance deviates from the setpoint value $d_1$, a setpoint acceleration $a_1$ is made available to increase the velocity of the vehicle and return the current following distance to the setpoint value $d_1$.

In an "overtaking assistance mode," the automatic speed control system continuously monitors appropriate vehicle controls and systems to determine when the driver has exhibited an intention to overtake the preceding vehicle. This determination may be made by, for example, continuous monitoring of turn indicators ("blinkers") that may be activated at the driver's command. The overtaking assistance mode may be continuously active during the follow mode, or it may be necessary for the driver to activate the overtaking assistance mode. In any event, as long as the intention of the driver to overtake has not been determined, the overtaking assistance mode does not intervene in the adaptive speed control process, and is said to be in a standby mode.

When the overtaking assistance mode is in the standby mode, the time at which the intention to overtake is determined is defined as a starting time $t_s$ and a first phase of the overtaking assistance mode is initiated at that time (block 110).

During the first phase, it is checked whether the current vehicle velocity v is greater than (or equal to) a predefined minimum velocity $v_{min}$ below which the activation of the turn indicators (or other condition used to determine the driver's intent) will not be considered a sufficiently reliable indication of the driver's intent to overtake. For example, activation of a turn signal at a speed below predefined minimum velocity $v_{min}$ may indicate the intention to turn off the road rather than to overtake. Advantageous values for the minimum velocity $v_{min}$ are, for example, approximately 50 km/h or approximately 65 km/h. At a velocity below minimum velocity $v_{min}$, the control system returns to the initial state, specifically the follow mode utilizing the parameters $d_1$ and $a_1$.

Also in the first phase (block 120), a first safety check may be carried out in which the value of a first safety function $S_1$ is evaluated. The first safety function value may be based on, for example, the measured current value of the vehicle yaw rate as an indication of cornering. If the yaw rate exceeds a predefined threshold value, the first safety function $S_1$ is set to the value 0, which also causes the control system to return to the initial state (block 120, "NO"). Otherwise, the first safety function assumes the value 1. The use of a binary logic in evaluating the first safety function $S_1$ is by way of example only.

If the velocity is higher than or equal to the minimum velocity $v_{min}$ and if the first safety function $S_1$ has the value 1 (block 120, "YES"), the setpoint distance for the adaptive cruise control process is set (at block 130) to a reduced distance $d_2$ appropriate for the up-coming overtaking maneuver. The distances $d_1$ and $d_2$ are determined according to control criteria and safety criteria, as discussed hereinabove. It is also possible to predefine a time interval which represents the time which the motor vehicle will require, at the current velocity, to travel the setpoint distance $d_1$ or $d_2$. It is therefore possible, for example, for the time interval in the follow mode to be 1.1 sec and to be reduced to 0.6 sec after the detection of the intention to overtake. Further vehicle-movement-dynamic variables can also be used in this context.

At block 140, appropriate systems and controls are monitored for an initiation of a lane change into the overtaking lane. When a lane change initiation is detected (for example, a steering input in the appropriate direction is detected and/or the vehicle carries out a corresponding yawing movement), the overtaking assistance mode enters a second phase, block 150. If no lane change initiation is detected within a time period Δt, for example 8 sec, the setpoint distance may be returned again to the follow mode value $d_1$. The control system then returns to the initial state, the follow mode.

In this second phase, it is initially checked whether the condition(s) used to indicate the driver's intention to overtake still exist. For example, whether the turn indicator is still set. If the driver's intention to overtake is no longer detected (i.e., he has switched off the turn indicator or set it to the other direction), this is detected as an intention to abort the overtaking process. In this case, the control system returns to the initial state.

The value of a second safety function $S_2$ may also be determined and evaluated at block 150. The second safety function $S_2$ may contain all or some of the variables and/or conditions used for the calculation of the first safety function $S_1$ and/or, if appropriate, further variables and conditions such as, for example, the current vehicle velocity and/or the steering angle change rate. If it becomes apparent from such variables/conditions that an overtaking process cannot be carried out safely, the value of the second safety function is set to 0 and the control system returns to the initial state (block 150, "NO").

If, on the other hand, the turn indicator remains on and the value of the second safety function $S_2$ is 1 (block 150, "YES"), the adaptive cruise control system makes available an increased acceleration $a_2$ (block 160). The use of a binary logic in evaluating the first safety function $S_1$ is by way of example only.

It is possible to impose a time limit for this step so that if the necessary conditions have not been met at the expiry of a time $\Delta t_a$, for example 3 sec, the control system returns to the initial state.

Figure 2A:
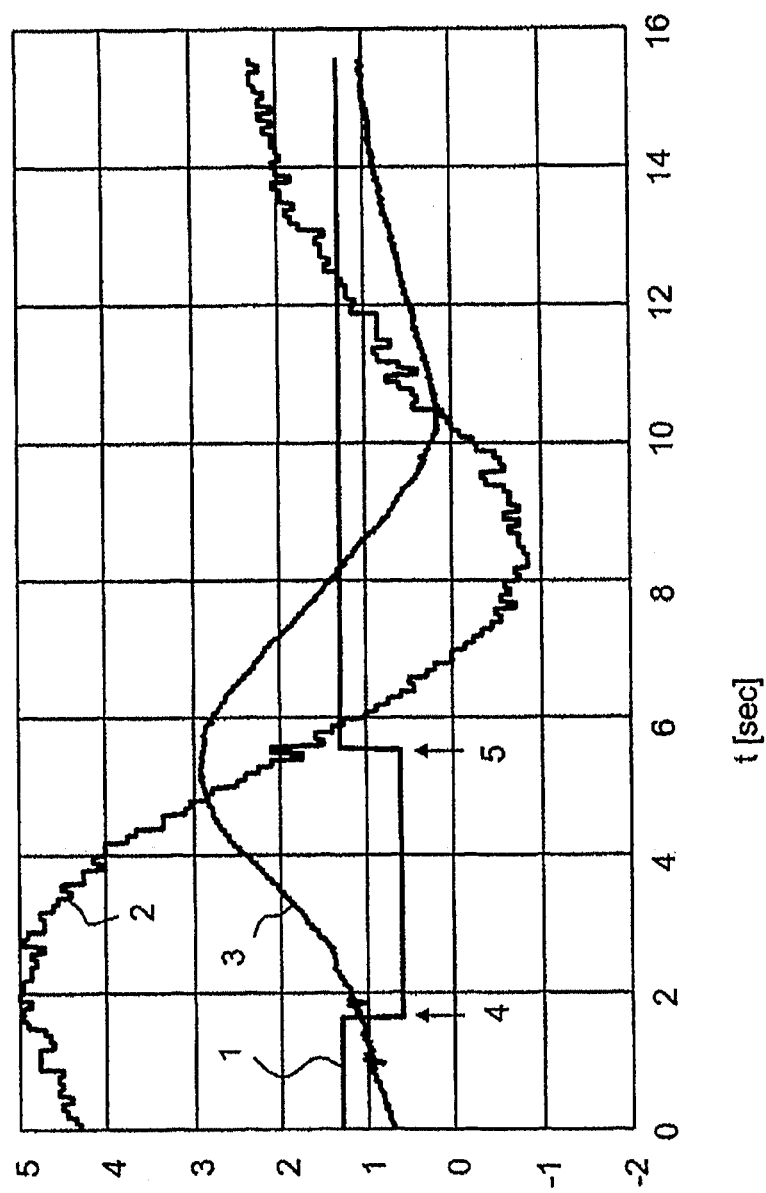
FIGS. 2a and 2b show the time profile of the distance, velocity and acceleration according to one exemplary embodiment of the method according to the invention.
Figure 2B:
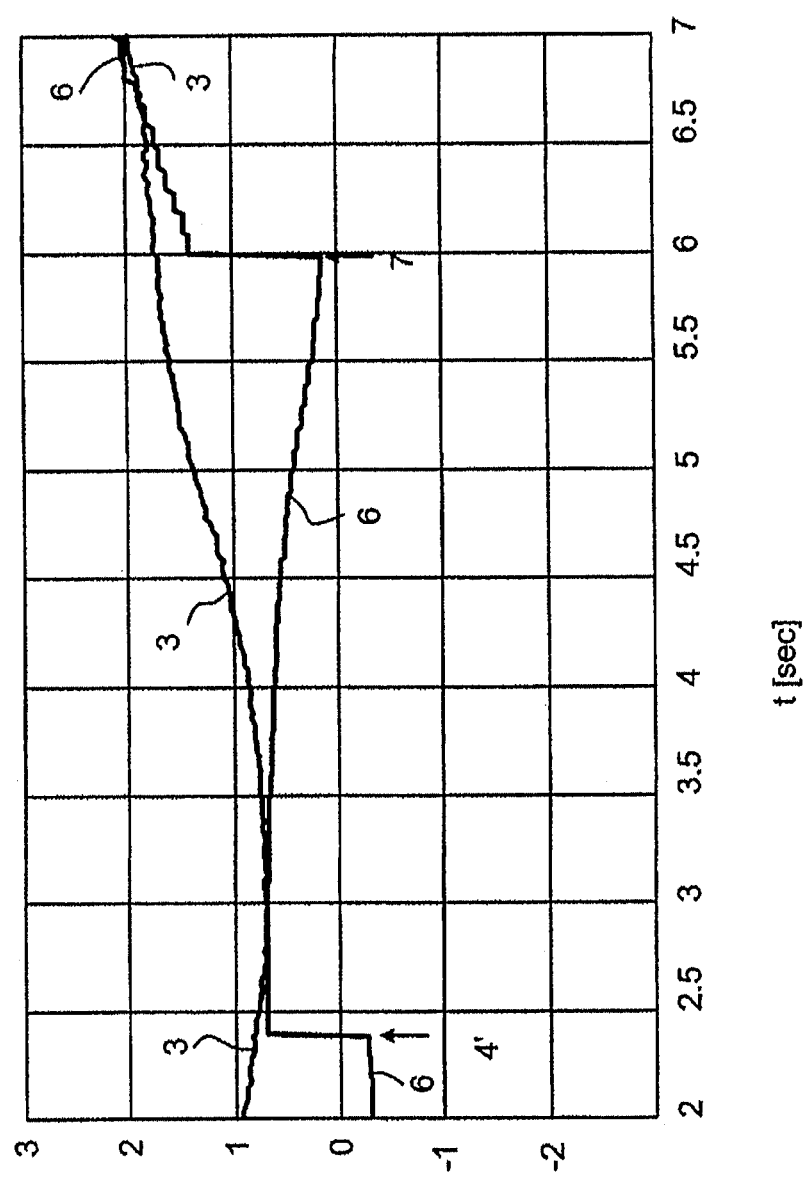

FIGS. 2a and 2b illustrate two different possible examples of the time profile of the setpoint distance (curve 1) from the preceding vehicle, the current distance (curve 2) from the preceding vehicle (with respect to a fixed distance) and the current velocity (curve 3) of the motor vehicle. In this context, the time is plotted on the abscissa. The specified variables are each plotted in random units on the ordinate.

At the time indicated with the arrow 4, according to FIG. 2a the driver's intention to overtake is detected by activation of the turn indicator and the first phase of the overtaking assistance mode is initiated. After the velocity and the first safety function have been checked, the setpoint distance 1 from the preceding vehicle is reduced. The automatic speed control system then intervenes in the engine controller and increases the velocity 3, as a result of which the distance 2 from the preceding vehicle, which initially was increasing slightly, is reduced.

However, according to FIG. 2a no lane change takes place. At the time indicated by the arrow 5, the overtaking process is aborted because, for example the driver has turned off the indicator or a predefined time period expires. The setpoint distance then returns to the earlier value, the control system returns to the initial state, and the velocity 3 is reduced to try to reach the earlier setpoint distance value. The acceleration and deceleration which are available for increasing and reducing are the velocity correspond to the adaptive cruise control in the follow mode and are relatively low so that the initial distance is not reached again until later along the profile of the time axis (not illustrated).

Turning now to FIG. 2b, at the time indicated by the arrow 4' the driver's intention to overtake is detected (turn indicator is activated, for example) and the first phase of the overtaking assistance mode is initiated. As in FIG. 2a, the velocity 3 is also increased at this time in order to reduce the distance from the preceding vehicle. The acceleration (curve 6) which is available for this is relatively low.

At the time indicated by the arrow 7, the driver moves the steering wheel in order to change over to the overtaking lane. The movement of the steering wheel and/or the corresponding yawing movement of the motor vehicle is detected and the second phase of the overtaking assistance mode is initiated. In this context, it is possible to use filtering and/or differentiation and/or integration of the steering wheel position to increase the reliability of detection of a lane change. After the turn indicator position and the second safety function have been checked, a significantly higher acceleration 6 is then available, as indicated by the upward jump in curve 6 at the time indicated at arrow 7. The motor vehicle reacts to the increased acceleration with an increase in velocity, as is also indicated in the right-hand region of the diagram.

FIG. 3a shows the traffic situation existing at the initial situation, when the automatic speed control system of a motor vehicle 8 is in the follow mode (normal ACC mode). The field of view 10 of the sensor(s) used by the speed control system is directed essentially straight ahead in order to detect obstacles occupying the lane 11 which vehicle 8 is currently travelling in. In the follow mode, the automatic speed control system intervenes in the engine controller to maintain the following distance d between the motor vehicle 8 and the preceding vehicle 9 essentially constant at the first setpoint distance $d_1$. A first setpoint acceleration $a_1$ is made available to maintain the following setpoint distance, as discussed above.

As is illustrated in FIG. 3b, the first phase of the overtaking assistance mode in which the distance d from the preceding vehicle is adjusted to a reduced setpoint value $d_2$ is triggered by the driver's intention to overtake, for example, activation of the turn indicators 12. In the first phase of this mode, the control system provides acceleration up to and including that value which is provided for the follow mode (setpoint value $a_1$), and so the following distance from the preceding vehicle is reduced. The first phase therefore simulates the approaching and acceleration which would be carried out by a human driver in order to prepare for an overtaking process. In the case illustrated in FIG. 3b, the overtaking maneuver may still be aborted so that no lane change takes place.

FIG. 3c shows a driving situation in which a lane change has been initiated a short time after the start of the first phase of the overtaking assistance mode by turning the steering wheel in the same direction in which the turn indicators 12 have been set. The distance d of the motor vehicle 8 behind the vehicle 9 has not yet been reduced significantly below the follow mode setpoint value $a_1$, but, owing to the detection of the initiation of a lane change, an increased acceleration has been made available, as indicated by the arrow 13. Owing to the steering wheel movement, the motor vehicle 8 will carry out a yawing movement and as a result carry out a lane change onto the overtaking lane 14 (not illustrated). The overtaking lane 14 may in principle be either a lane of a multi-lane single-direction carriageway as well as that of an oncoming carriageway. The second phase makes available the acceleration with which a human driver would carry out the overtaking process, and may be the maximum acceleration of which the vehicle is capable. Together with the acceleration and, if appropriate, the approach to within the reduced setpoint distance $d_2$ in the first phase, this permits a safe, comfortable and free-flowing overtaking process.

Figure 4:
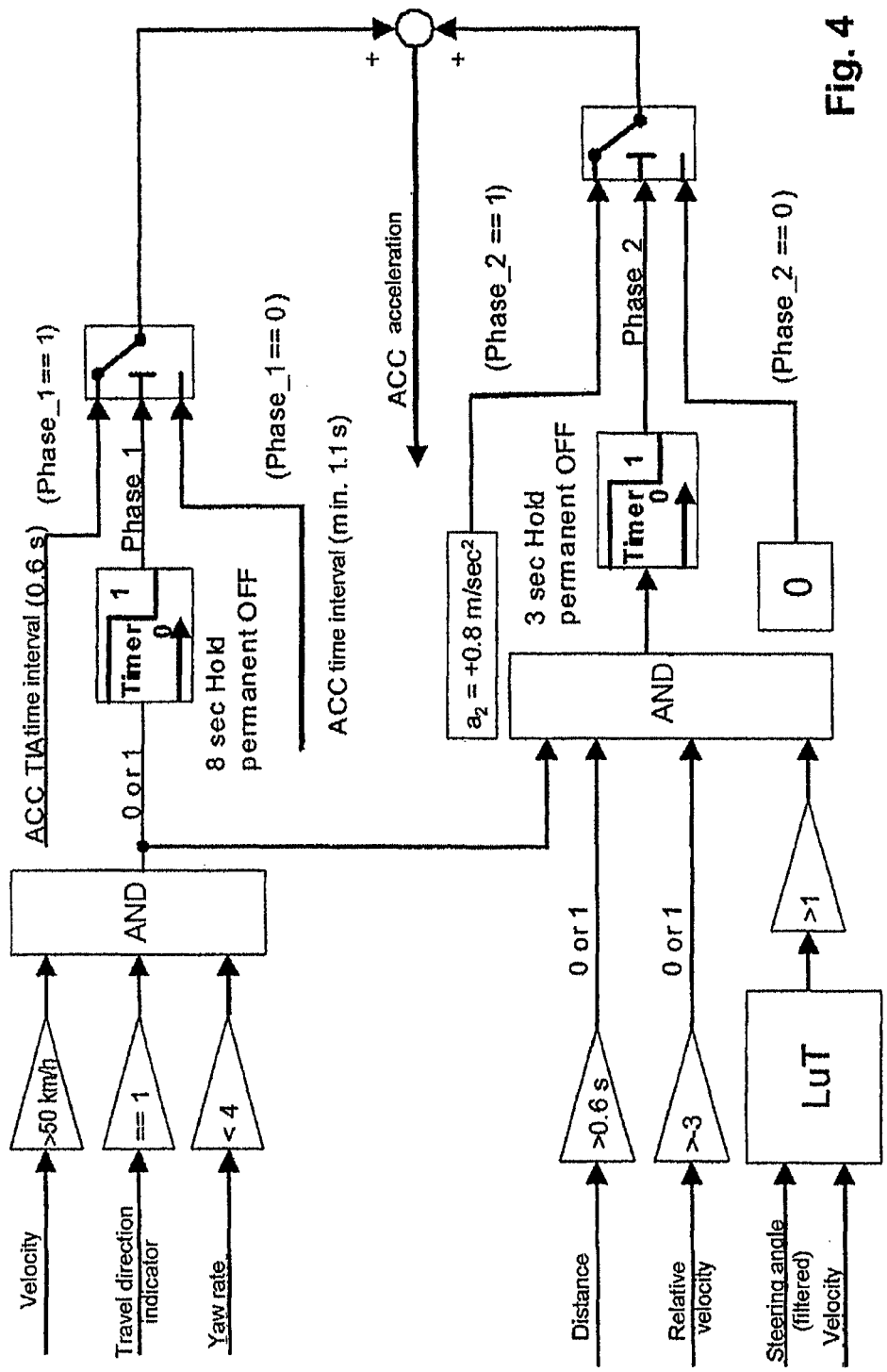
FIG. 4 shows a symbolic circuit diagram of the implementation of a device according to the invention.

FIG. 4 shows by way of example a symbolic circuit diagram for part of a control device for carrying out a method as described hereinabove. In order to initiate the first phase ("Phase_1" in FIG. 4), the current velocity, the position of the turn indicators, and the yaw rate are evaluated. For this purpose, a first safety function, which can assume the values 0 or 1, is calculated. If the first safety function has the value 1, the first phase of the overtaking assistance mode is initiated. In this case, the time interval of the overtaking assistance mode ("turn indicator assist", TIA), for example 0.6 sec, is selected. The first phase is maintained for a maximum of 8 sec. If the first safety function has the value 0, the first phase is not initiated. In this case, the time interval continues to be at least 1.1 sec.

In order to initiate the second phase, the first safety function, the distance, the relative velocity, the steering angle and the velocity are evaluated for a second safety function, and the last two variables are evaluated using a stored table ("Look-up Table", LuT). If the second safety function yields the value 1 and if correspondingly the second phase is initiated, an increased acceleration $a_2$ is made available, 0.8 m/sec$^2$ in this case. Otherwise, and after the expiry of 3 sec, no increased acceleration is made available. The respective acceleration value is transmitted to the automatic speed control system (ACC).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method for operating an automatic speed control system of an automotive vehicle comprising:
   setting a setpoint distance between the vehicle and a preceding vehicle to a first value $d_1$ and setting a setpoint vehicle acceleration utilized to at least one of establish and maintain $d_1$ to a non-zero first value $a_1$;
   after determining a driver's intention to overtake the preceding vehicle, setting the setpoint distance to a second value $d_2$ smaller than $d_1$;
   accelerating the vehicle at setpoint acceleration $a_1$ to reduce a following distance between the vehicle and the preceding vehicle to a value smaller than value $d_1$ and larger than value $d_2$ while the vehicle maintains an original lane; and
   only after detecting an initiation of a lane change into an overtaking lane, setting the setpoint acceleration to a second value $a_2$ greater than $a_1$.

2. The method of claim 1, wherein the driver's intention to overtake is determined based at least in part upon an activation by the driver of a vehicle turn indicator.

3. The method of claim 2, wherein the lane change initiation is determined based upon at least one of a steering angle, a steering angle change rate, a time integral of the steering angle, a yaw rate of the vehicle, and a lateral acceleration of the vehicle.

4. A method for operating an automatic speed control system of an automotive vehicle comprising:
   setting a setpoint distance between the vehicle and a preceding vehicle to a first value $d_1$ and setting a setpoint vehicle acceleration to a first value $a_1$;
   after determining a driver's intention to overtake the preceding vehicle, setting the setpoint distance to a second value $d_2$ smaller than $d_1$ and accelerating the vehicle at first value $a_1$ to reduce an actual distance between the vehicle and the preceding vehicle while the vehicle maintains an original lane; and
   only after a) the actual distance is reduced to less than the first value $d_1$, and b) detection of an initiation of a lane change into an overtaking lane, setting the setpoint acceleration to a second value $a_2$ greater than $a_1$.

5. The method of claim 4, wherein when the driver's intention to overtake is detected at a starting time, the second acceleration $a_2$ is set only if the lane change initiation is detected during a time period after the starting time, and if the lane change initiation is not detected within the time period the setpoint distance is returned to the first distance $d_1$.

6. The method of claim 4, wherein the second acceleration $a_2$ is set for a time interval and the first acceleration $a_1$ set at the expiry of the time interval.

7. The method of claim 5, wherein the second available acceleration $a_2$ may be set only once within the time period after the starting time.

8. The method of claim 4, wherein the driver's intention to overtake is determined based at least in part upon an activation by the driver of a vehicle turn indicator.

9. The method of claim 4, wherein the driver's intention to overtake is determined at least in part upon whether a velocity of the vehicle is higher than a predefined limiting value.

10. The method of claim 4, wherein the lane change initiation is detected based upon at least one of a steering angle, a steering angle change rate, a time integral of the steering angle, a yaw rate of the vehicle, a lateral acceleration of the vehicle, and activation of a turn indicator by the driver.

11. The method of claim 4, wherein the initiation of a lane change is detected based at least in part upon whether a turn indicator is activated.

12. The method of claim 4, further comprising evaluating a first safety function and wherein the second distance $d_2$ is set only if a value of the first safety function is in a predetermined range.

13. The method of claim 12, wherein the first safety function is based on at least one of a velocity of the vehicle, an angular velocity of the vehicle, a distance from the preceding vehicle, a relative velocity with respect to the preceding vehicle, and a yaw rate.

14. The method of claim 12, further comprising evaluating a second safety function and wherein the second acceleration $a_2$ is set only if a value of the second safety function is in a second predetermined range.

15. The method of claim 14, wherein the second safety function is based on at least one of a velocity of the vehicle, an angular velocity of the vehicle, a distance from the preceding vehicle, a relative velocity with respect to the preceding vehicle, and a yaw rate.

16. The method of claim 1 wherein when, after detection of the driver's intention to overtake, a driver's intention to abort overtaking is detected, the setpoint distance is set to the first value $d_1$, and the setpoint acceleration is set to the first value $a_1$.

* * * * *